United States Patent [19]

Imris

[11] 4,152,603
[45] May 1, 1979

[54] DEVICE FOR THE PRODUCTION OF OZONE

[76] Inventor: Pavel Imris, Konigsberger Strasse 4, 3257 Springe 3, Fed. Rep. of Germany

[21] Appl. No.: 839,440

[22] Filed: Oct. 5, 1977

[30] Foreign Application Priority Data

Oct. 6, 1976 [DE] Fed. Rep. of Germany ....... 2644978

[51] Int. Cl.$^2$ .......................... B01J 1/10; C01B 13/11
[52] U.S. Cl. ..................................... 250/535; 250/532
[58] Field of Search .............. 250/532, 535, 536, 537; 204/176

[56] References Cited
FOREIGN PATENT DOCUMENTS 5656 of 1895 United Kingdom ..................... 250/536

Primary Examiner—Benjamin R. Padgett
Assistant Examiner—Deborah L. Kyle
Attorney, Agent, or Firm—Posnack, Roberts, Cohen & Spiecens

[57] ABSTRACT

An apparatus for the production of ozone employing three parallel spaced plate shaped electrodes having electrically conductive surfaces and joining the ends thereof electrically non-conductive members. A pulsating voltage is applied to the outer plates causing ions to collect along the non-conductive members and a corona to form. An oxygen bearing gas stream passes through the chamber and ozone forms therein.

8 Claims, 7 Drawing Figures

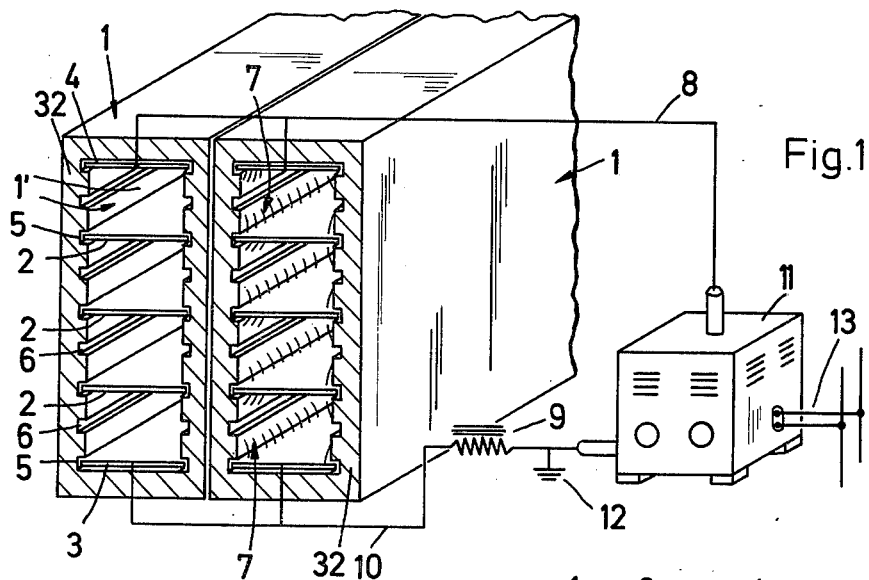
Fig.1
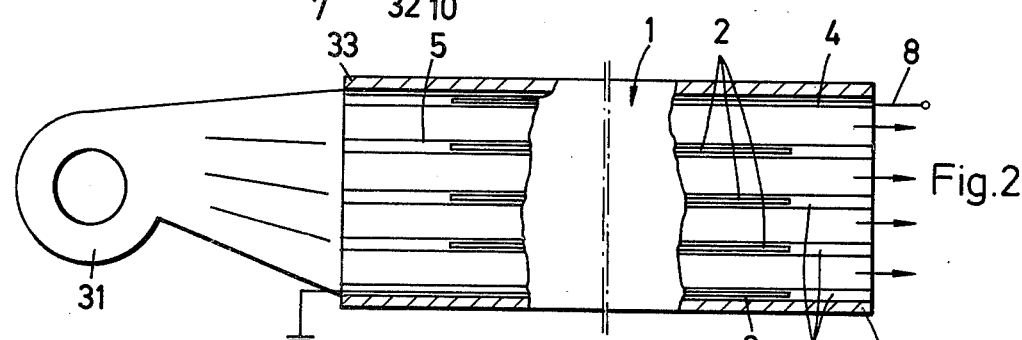
Fig.2
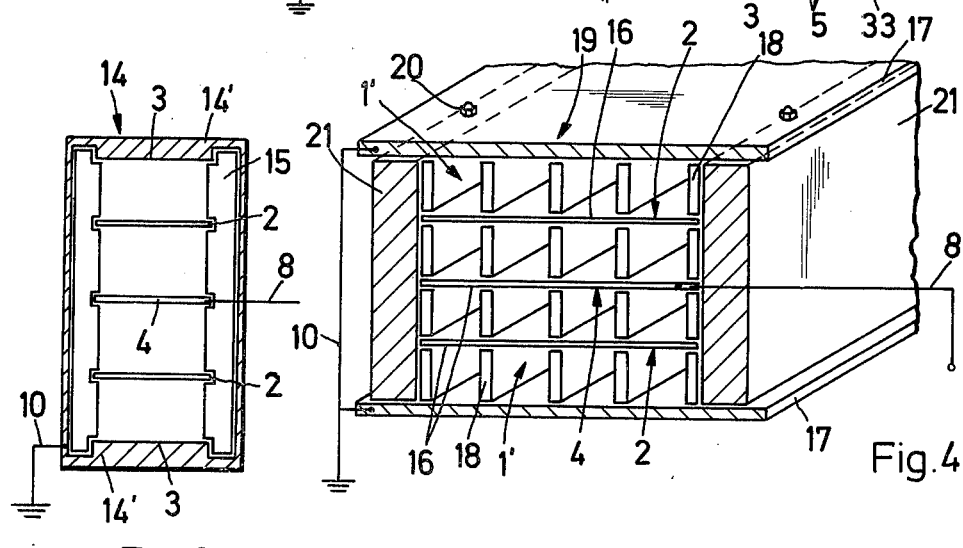
Fig.3
Fig.4

DEVICE FOR THE PRODUCTION OF OZONE

BACKGROUND OF THE INVENTION

For the synthesis of ozone molecules energy is necessary which can be provided by photons or electrons. The apparatus using photons for $O_3$ synthesis are ultraviolet lamps, X-ray equipment or chemico-nuclear reactors. The present apparatus in which electrons are used for $O_3$ synthesis generates alternating-current or direct-current discharge coronas. Hitherto, there has been only one viable utilization of the direct-current discharge corona, namely as disclosed in applicant's co-pending application Ser. No. 717,190 filed on Aug. 24, 1976, now U.S. Pat. No. 4,062,748.

Alternating-current corona instruments to produce ozone have been known since the beginning of this centry by the name "Siemens ozonisers". The basic principle of these alternating-current ozonisers is the known alternating-current corona which is generated in the space between the electrodes covered with dielectrics. Ozonisers with plate electrodes or tubular electrodes are based on this principle. In "Siemens ozonisers" the use of a dielectric is absolutely essential for generating the alternating-current corona. It has not been possible heretofore to generate an alternating-current corona without the said dielectric. Joule's heat which has to be dissipated from the ozoniser by cooling is produced in the dielectric. Further, the Siemens ozoniser requires dry gas in the space between the electrodes. Water has to be extracted from the oxygen-containing gas down to 0.01 g of $H_2O$ per $m^3$, which corresponds to a dew point of approximately $-60°$ C. It is impossible to generate an alternating-current corona if the humidity of the gas is at e.g. a dew point of $+20°$ C., which corresponds to 17.5 g of $H_2O$ per $m^3$. The problem of the invention is to create a device for the production of ozone, namely on the basis of an alternating-current high voltage, excluding a dielectric, cooling of the device and prior dehydration of the oxygen-containing gas for conversion into ozone.

This problem is solved with a device of the above-mentioned type by the fact that there are arranged spaced and standing opposite one another in the discharge tube whose walls consist of electrically-non-conductive material, two plate electrodes which are connected to an alternating-current high-voltage source and/or high-voltage source for pulsating direct current and between which at least one bipolar electrode is arranged free of current connection.

This solution is based on the following:

Atmospheric air or oxygen is partly ionised by cosmic radiation or by ultra-violet radiation from the sun. When such partly ionised air flows through the discharge tube of the device and when alternating-current voltage oscillates between the electrodes, the ions migrate by the known "skin effect" from the center of the discharge tube between the electrodes to its walls where a thin layer of electrically charged gas molecules or gas atoms accumulates. This layer is two to three times more electrically conductive than the total gas in the discharge tube.

On a further increase in the voltage, current begins to flow on the surface through the thin layer of ions, i.e., an alternating-current corona is generated which, in turn, generates many more ions from the molecular gas. These ions continue to collect by skin effect on the walls of the discharge tube. The alternating-current of the corona (in the order of milliamperes) along the walls of the discharge tube can be controlled by the adjustable alternating-current voltage.

If, on the other hand, a direct-current voltage is generated between the electrodes, no current at all flows between the electrodes and thus none either on the walls and none either between the plate electrodes.

When direct current flows through a homogeneous conductor the current distribution through the cross section is homogeneous, hence uniform. In the case of alternating-current or pulsating direct-current, the density of the current is displaced to the surface of the conductor. This "skin effect" is utilized in the solution according to the invention, thereby presenting the following advantages:

The arrangement of a dielectric is superfluous and Joule's heat which otherwise occurs does not have to be dissipated. At the relatively low temperature of the alternating-current corona no nitrous gases arise.

The device according to the invention requires no pre-dried air and consequently no additional energy.

In comparison with the device in the above-referenced co-pending application Ser. No. 717,190 there are, besides, the following advantages:

The electrodes and bipolar electrodes do not need any discharge points and an alternating-current transformer is used which is less expensive than a direct-current generator. The alternating-current corona starts at a substantially lower voltage than does a direct-current corona, i.e., the voltage of the alternating-current corona lies between 5,000 and 40,000, i.e., it is controllable within a range of 35,000 volts. The direct-current corona on the device according to applicant's co-pending application Ser. No. 717,190 has a voltage of 25,000 to 40,000 volts, i.e., twice as narrow a control range is present therewith as with the alternating-current corona. The breadth of the controllable voltage of the corona is of importance for the electronic control of the ozoniser.

A further important advantage of the present device over that according to applicant's co-pending application Ser. No. 717,190 lies in the fact that with this alternating-current corona many more bipolar electrodes can be used than with the direct-current corona and, therefore, the ozone yield in g/kWh is even larger than that indeed obtained on the device operated by direct current in comparison with the known state of the art.

The device according to the invention is explained below with reference to the accompanying drawing.

BRIEF DESCRIPTION OF THE DRAWINGS

FIG. 1 is a perspective and sectional view of the device according to the invention with two discharge tubes arranged next to one another and comprising multiple members;

FIG. 2 is a side view of a discharge tube partly in longitudinal section and partly in elevation;

FIG. 3 is a cross section of a discharge tube in a special form of construction;

FIG. 4 is a cross section of a further form of construction of discharge tubes arranged in a block;

DESCRIPTION OF THE PREFERRED EMBODIMENT

Figure 5:
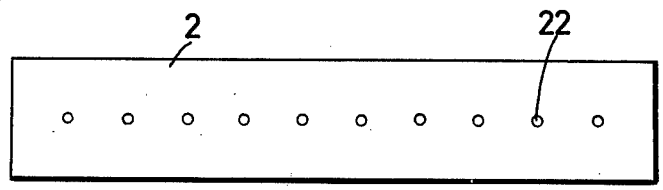
FIG. 5 is a top view of a special form of construction of a bipolar electrode.

The discharge tubes 1 consist of an electrically non-conductive material, for example PVC or the like. Grooves 5 have inserted in them metal plates which form the discharge electrode 4, the earthed electrode 3 and the bipolar electrodes 2.

An impedance 9 is connected in series between electrode 3 and the output of high-voltage transformer 11, the input thereof being connected to alternating-current source 13. With an alternating-current output from the transformer 11 of about 7,000 volts alternating-current coronas 7 appear on the inner surface of the walls of the discharge tube 1. The alternating-current coronas 7 start directly at the points where the walls of the discharge tube 1 meet the surfaces of the electrodes 2, 3 or 4. The length of the light-emitting alternating-current coronas 7 is approximately 2 to 3 mm at any given time. With a further increase of the alternating-current voltage the alternating-current of the corona rises and the corona 7 remains stable up to approximately 1000 V of voltage per mm of length of the gap between electrodes 3,4. If, however, the alternating-current voltage is increased still further, short-circuits start immediately between the electrodes 2,3,4, which means that the current ought not be increased further. The impedance 9 improves inductive reactance in the discharge channels 1', although it is not important for the principle of the generation of alternating-current coronas. Each corona 7 is constantly retained on the corresponding inner faces of the channels 1' and never jumps into the middle of the individual channels 1'. Additional grooves 6 (Fig. 1) are not essential to the operating principle, although they represent an advantageous development with regard to possible dust deposits over a lengthy period of operation. If dust were to settle on the walls of the channel 1' after a long time, conductivity on the walls of the channels 1' could be prejudiced. The grooves 6 break up the possible layer of dust on the inner walls, however, and forestall the additional conductivity of the possible layer of dust.

FIG. 2 shows that the bipolar electrodes 2 cease a little before the ends of the discharge tube 1, while the electrodes 3,4 are carried on the connection side as far as the appropriate end of the discharge tube 1. Direct discharges between the ends of the electrodes 3,4 are thereby avoided.

FIG. 3 shows another form of construction of the discharge tube consisting of a metal profile 14 which has inserted on the inside plates 15 consisting of an electrically non-conductive material. These plates 15 are formed from PVC, ceramic, glass or the like. Here, the high-voltage electrode 4 rests in the middle of the tube and the upper and lower walls of the metal profile 14 simultaneously form the earthed electrodes 3. To a certain degree such a tube forms in itself a double channel where material is saved on the electrodes 4, as well as one wall of the discharge tube, in comparison with an arrangement according to FIG. 1.

FIG. 4 represents a block of several discharge tubes arranged in parallel. The entire block is composed of metal plates, insulated plates and screws. The metal plates 16, 17 engage over several channels and form the electrodes 3, 4 and bipolar electrodes 2. The vertical insulator plates 18 are fixed with screws 19 or connected in another way to the metal plates 16, 17. The complete block is tightened with screw bolts 20. The bolts 20 pass through walls 21 which consist of an electrically non-conductive material, hence are electrical insulators.

The electrodes 2, 3, 4 normally consist of simple metal strips, such as stainless steel or the like, which slip into grooves 5. As shown in FIG. 5 the metal strips for the bipolar electrodes 2 can be provided with small holes 22 which improve the enchange of metastable ions in the channels 1' between the bipolar electrodes 2.

Figure 6:
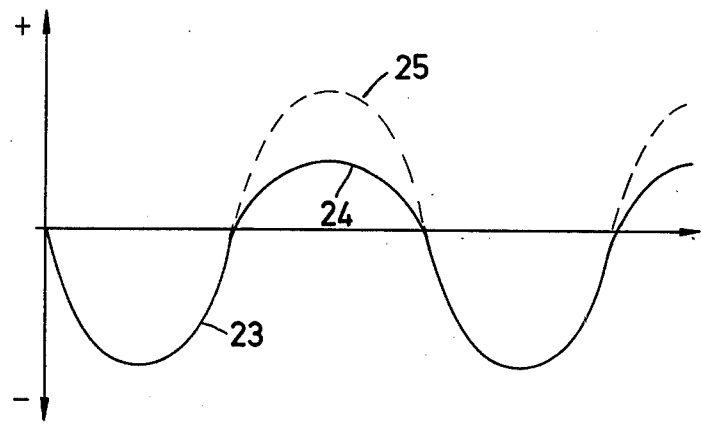
FIG. 6 is the sine curve of an alternating-current in conjunction with a pulsating direct-current.

A sine-wave current with a frequency of 50Hz can be used to generate the alternating-current coronas. Other frequencies, such as to 10 KHz, are likewise useful. A sine-wave form of the alternating-current is not absolutely necessary. In ozone production, with the device described, a mixture of alternating current and pulsating direct current can also be utilized. Such a wave form is represented in FIG. 6. The amplitude of the alternating-current varies from the negative half cycle 23 to the positive half cycle 25 etc. If, for example, a semi-amplitude is filtered off from the positive half cycle 25, the entire sine-wave form of the alternating current is distorted, as shown in FIG. 6, i.e., the negative half cycle 23 remains unaffected and the positive half cycle is reduced to the semi-amplitude 24. Such a wave form of the current can be achieved, for example, with the circuit represented in FIG. 7. The high-voltage transformer 11 serves as a source for the alternating-current. A half-wave rectifier 26 is inserted in series with the high-voltage cable 8. The electrical circuit is closed via the channel 1 and the earthed cable 10 back to the high-voltage transformer 11. A pulsating direct-current with only the half cycle 23 (FIG. 6) is generated in such an electrical circuit. If, however, for example, a capacitor 27, an impedance 28 or an ohmic resistor 30 is connected in parallel to the rectifier 26, another positive half cycle with reduced amplitude 24 flows through capacitor 27, impedance 28 or resistor 30. The amplitude of the pulse 24 can be controlled by varying the capacitance of the capacitor 27, the inductive resistance of the impedance 28 or resistance of the resistor 30. The term "pulsating current" as employed in the claims is intended to encompass alternating, half-wave and pulsating direct-current.

Figure 7:
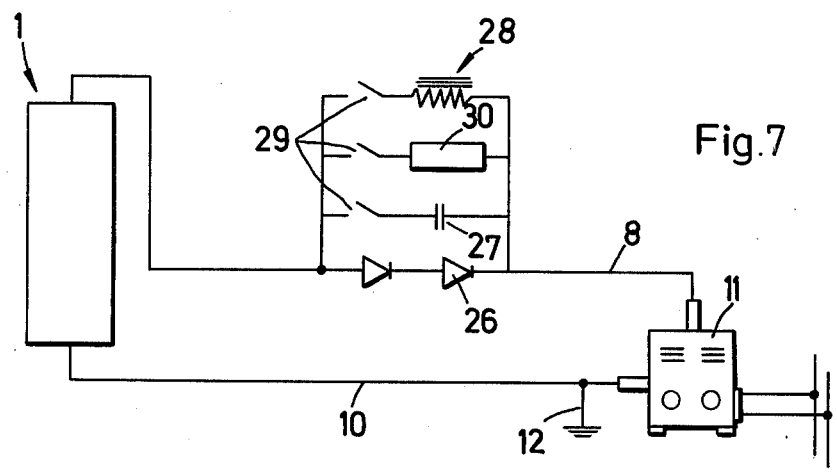
FIG. 7 is the electrical circuit for generating the alternating current with pulsating direct current.

The said electrical elements can be selectively inserted in the circuit by means of an appropriate one of the switches 29. With the circuit according to FIG. 7 the form of the current can, therefore, be varied from 100% pulsating direct-current to a mixture of direct-current and alternating-current and, further, to 100% alternating-current. The circuit represented in FIG. 7 is useful for varying the corona parameters, for the kinetics of ozone synthesis, and also for other chemical syntheses conducted with corona discharges.

The discharge tube 1 (FIG. 1) consists of hard PVC. The inside width of the channels 1' is 14 mm and the inside height of all channels 1' is around 40 to 60 mm. The thickness of the PVC walls of the discharge tube 1 to 7 mm. The axial length of the discharge tube 1 is about 1 to 3 mm. The depth of the grooves 5 is 2.5 mm and their height is 0.8 mm. The width of the electrodes 2, 3, 4 is 18 mm and their thickness is around 0.6 mm. The gap between the electrodes 2, 3, 4 is 7 to 20 mm. The electrodes 2, 3, 4 consist of aluminum, stainless steel or the like. Particularly suitable is stainless steel grade X8 Cr 17, material number 14016. The electrodes 2 are provided in the middle with holes approximately 2mm in diameter and with a spacing between them of 8 mm. The high-voltage transformer 11 has to generate a voltage of up to 40,000 Volts, controllable from zero to 40,000 Volts. The choke 9 inserted in series with the cable 10 lies in the millihenry (mH) range. The energy input for a discharge tube 1 m long is between 30 to 50 watts. The energy input for a discharge tube 1 with a length of 3 m is approximately 100 watts. The energy input for a double discharge tube, as represented in FIG. 3, is twice that mentioned above. The channels can be composed in parallel to any number desired. With an energy input of 1 Kilowatt approximately 30 discharge tubes, each 1 m long, or 10 discharge tubes, each 3 m long, can be fed. For double tubes, each 1 m long, 15 channels are required for 1 Kilowatt of energy input.

The oxygen-containing gas must be cleaned of large dust particles. The size of the dust particles present may not exceed 3 microns. The humidity of the oxygen-containing gas can lie between minus 41 dew point and plus 46 dew point, i.e., between 0.1 g $H_2O/M^3$ and 70g $H_2O/M^3$. This air humidity is approximately 2000 times greater than that required by present-day Siemens ozonisers, i.e., the device described requires no dry air, generates no heat and, consequently, needs no cooling. At an energy input of 0.5kw, for example, the temperature of the oxygen-containing gas is 23° C. at the entrance of the discharge tube and 24° C. at the exit. The absolute pressure of the oxygen-containing gas supplied by a gas feeder 31 can lie between 0.6 atm. and 2 atm. A higher gas pressure will not disturb the corona, however. The concentration of ozone per litre of air at dew point plus 20° C. (17.5 g $H_2O/M^3$) is between 1 mg/1 and 25 mg/1. With a constant energy input, variation of the ozone concentration depends on the air volume only.

The efficiency of the device described, defined as grams of ozone per kilowatt-hour, depends on the electrical gradient across the total gap of electrodes 3,4 (defined as volts per millimeter - V/mm), as well as on the number of bipolar electrodes 2 (Nbi) and on a constant (C). The following mathematical relation is obtained:

$$g\ O_3/kWh = \frac{(V/mm) \cdot (Nbi + 1)}{C}$$

With this equation the ozone production per kilowatt-hour can be calculated from the experimental data given in the following tables 1 and 2:

TABLE 1

| Test Number | Gap (mm) | Current (mA) | 1 bipolar KV | 1 bipolar V/mm | 2 bipolar KV | 2 bipolar V/mm | 3 bipolar KV | 3 bipolar V/mm | C |
|---|---|---|---|---|---|---|---|---|---|
| 1 | 40 | 0,1 | 26,2 | 655 | 29,5 | 737 | 31,0 | 775 | 110 |
| 2 | 40 | 0,2 | 29,0 | 725 | 31,6 | 790 | 33,2 | 830 | 50 |
| 3 | 40 | 0,3 | 30,8 | 770 | 33,2 | 830 | 34,8 | 870 | 36 |
| 4 | 40 | 0,4 | 32,1 | 802 | 34,7 | 867 | 36,2 | 905 | 32 |
| 5 | 40 | 0,5 | 33,5 | 837 | 36,0 | 900 | 37,3 | 932 | 30 |
| 6 | 40 | 0,6 | 35,0 | 875 | 36,9 | 922 | 38,2 | 955 | 33 |
| 7 | 40 | 0,7 | 35,9 | 897 | 38,0 | 950 | 39,2 | 980 | 45 |
| 8 | 40 | 0,8 | 36,7 | 917 | 39,0 | 975 | 40,0 | 1000 | 66 |
| 9 | 40 | 0,9 | 37,5 | 937 | 39,7 | 992 | — | — | 100 |
| 10 | 40 | 1,0 | 38,4 | 960 | — | — | — | — | 140 |
| 11 | 40 | 1,1 | 39,0 | 975 | — | — | — | — | 165 |
| 12 | 40 | 1,2 | 40,0 | 1000 | — | — | — | — | 175 |

TABLE 2

| Test Number | Gap (mm) | Current (mA) | 1 bipolar KV | 1 bipolar V/mm | 3 bipolar KV | 3 bipolar V/mm | 5 bipolar KV | 5 bipolar V/mm | C |
|---|---|---|---|---|---|---|---|---|---|
| 1 | 45 | 0,1 | 11,8 | 262 | 12,0 | 266 | 12,3 | 273 | 37 |
| 2 | 45 | 0,2 | 15,7 | 349 | 16,0 | 355 | 16,2 | 360 | 70 |
| 3 | 45 | 0,3 | 19,8 | 440 | 20,0 | 444 | 20,5 | 455 | 56 |
| 4 | 45 | 0,4 | 23,0 | 511 | 23,2 | 515 | 23,5 | 522 | 40 |
| 5 | 45 | 0,5 | 25,2 | 560 | 25,6 | 568 | 25,8 | 573 | 30 |
| 6 | 45 | 0,6 | 27,4 | 608 | 27,7 | 615 | 28,0 | 622 | 22 |
| 7 | 45 | 0,7 | 29,3 | 651 | 29,8 | 662 | 30,1 | 668 | 20 |
| 8 | 45 | 0,8 | 31,0 | 688 | 31,4 | 697 | 31,5 | 700 | 19 |
| 9 | 45 | 0,9 | 32,7 | 726 | 33,0 | 733 | 33,3 | 740 | 19 |
| 10 | 45 | 1,0 | 34,3 | 762 | 34,6 | 769 | 34,8 | 773 | 24 |
| 11 | 45 | 1,1 | 35,6 | 791 | 36,0 | 800 | 36,2 | 804 | 40 |
| 12 | 45 | 1,2 | 36,8 | 817 | 37,2 | 826 | 37,5 | 833 | 65 |
| 13 | 45 | 1,3 | 37,5 | 833 | 38,0 | 844 | 38,3 | 851 | 95 |
| 14 | 45 | 1,4 | 38,8 | 862 | 38,8 | 862 | 39,0 | 866 | 123 |
| 15 | 45 | 1,5 | 39,5 | 877 | 39,7 | 882 | 40,0 | 888 | 133 |

By the gap in mm in the attached Tables 1 and 2 is meant the gap between electrodes 3,4. The current (mA) is the corona current and the voltage (kV) is given for the appropriate bipolar electrode 2 and the gradient of the corona indicated in V/mm. The data in Tables 1,2 relate to a discharge tube 1 m in length. Table 1 contains for comparison the data for a direct-current corona discharge with tooth-shaped bipolar electrodes according to applicant's copending application Ser. No. 717,190. Table 2 contains the data for alternating-current coronas with bipolar electrodes 2, hence the data which is obtainable with the present device.

The constant C in the tables is an experimental constant which can be calculated according to the above-mentioned formula.

The constant C is a function of several physical parameters which represent mathematically a non-linear system.

The data in Tables 1 and 2 are measured at an air pressure of 760 torr and at a dew point between plus 15° and plus 20° C.

The values of the ozone yield at any given time can be calculated in g/kWh directly from the volumes in the table according to the above-mentioned formula.

What is claimed is:

1. An apparatus for production of ozone comprising:
   (a) a tube, having a central axis, open at each end and having electrically non-conductive inner walls,
   (b) first and second electrically conductive plates aligned with each other in spaced relationship and with the said axis, and extending to said inner walls,
   (c) a first bipolar electrode interposed between said first and second conductive plates and extending to said inner walls,
   (d) a source of pulsating current connected to said first and said second conductive plates; and
   (e) means for introducing oxygen containing gas into said tube.

2. The apparatus of claim 1 including slots in the said inner walls for receiving said plates.

3. The apparatus of claim 1 including a third electrically conductive plate spaced from the said first electrically conductive plate and electrically connected to said second electrically conductive plate and a second bipolar electrode interposed between said first and third plates.

4. The apparatus of claim 1 wherein said first bipolar electrode is perforated.

5. An apparatus for production of ozone comprising:
   (a) a tube, having a central axis, open at each end and formed of an electrically conductive material, having a first pair of opposed faces and a second pair of opposed electrically non-conductive inner walls,
   (b) an electrode interposed between said pair of opposed faces and extending between said second pair of opposed electrically non-conductive inner walls,
   (c) a source of pulsating current connected between said electrode and said tube,
   (d) a bipolar electrode interposed between said electrode and each of said opposed faces; and
   (e) means for introducing oxygen containing gas into said tube.

6. The apparatus of claim 5 wherein said bipolar electrode is perforated.

7. The apparatus of claim 3 including a plurality of electrically non-conductive members extending between the electrically conductive plates and bipolar electrodes defining a plurality of parallel chambers.

8. The apparatus of claim 1 wherein grooves are located in said non-conductive side walls between said plates and said bipolar electrodes.

* * * * *